United States Patent
Murphy

[15] 3,663,351
[45] May 16, 1972

[54] VAPOR PERMEABLE POLYURETHANE ADHESIVE AND FINISH LAYERS IN ARTIFICIAL LEATHER

[72] Inventor: Walter T. Murphy, Cuyahoga Falls, Ohio

[73] Assignee: The B. F. Goodrich Company, New York, N.Y.

[22] Filed: July 24, 1970

[21] Appl. No.: 58,167

[52] U.S. Cl. .......................... 161/159, 117/63, 117/DIG. 7, 117/140 A, 117/76 T, 117/161 KP, 117/135.5, 161/82, 161/190, 161/DIG. 2, 260/2.5 AY, 260/29.2 TN
[51] Int. Cl. ..................................... B32b 5/18, B32b 27/40
[58] Field of Search ............. 260/2.5 AY; 161/190, 160, 161, 161/159, 156, 62, 83, 84, 85; 117/63, 76 T, 135.5

[56] References Cited

UNITED STATES PATENTS

| | | | |
|---|---|---|---|
| 3,536,572 | 10/1970 | Murphy et al | 161/156 X |
| 3,348,963 | 10/1967 | Fukushima et al | 117/63 |
| 3,067,482 | 12/1962 | Hollowell | 28/74 |
| 3,483,015 | 12/1969 | Fukushima et al | 117/63 |
| 3,536,572 | 10/1970 | Murphy et al | 161/84 |
| 3,460,969 | 8/1969 | Murphy | 117/63 |
| 3,336,183 | 8/1967 | Larner | 161/156 |
| 3,384,502 | 5/1968 | Japs | 117/5.5 |
| 3,462,326 | 8/1969 | Steel et al | 156/72 |
| 3,505,096 | 4/1970 | Egitto et al | 117/56 |

*Primary Examiner*—Robert F. Burnett
*Assistant Examiner*—C. B. Cosby
*Attorney*—Albert C. Doxsey and J. Hughes Powell, Jr.

[57] ABSTRACT

A vapor permeable adhesive based on a combination of polyurethane and water dissolved in tetrahydrofuran (THF) is supplied to adhere the elements of a vapor permeable laminate construction. As a thin top coating on the said laminate the said adhesive dries to form a durable microporous surface finish. A thixotropic viscosity improver added to the polyurethane-water-THF cement, insures acceptable moisture vapor permeability.

1 Claim, No Drawings

VAPOR PERMEABLE POLYURETHANE ADHESIVE AND FINISH LAYERS IN ARTIFICIAL LEATHER

BACKGROUND OF THE INVENTION

It is known in the art (United States Pat. No. 3,460,969) to form a microporous, vapor permeable, laminate construction by coating a permeable textile substrate with a fluid wet film of a thixotropically thickened cement of an essentially linear polyurethane dissolved in dimethylformamide. The cement contains water sufficient to give it a cloud point above 36° C., and it is coated onto the substrate at a temperature above this cloud point, generally at a temperature of from 45° to 65° C.

When a wet film of this cement is spread on a textile substrate, or upon a nonadhering substrate such as glass, and is exposed to room temperature air for 1 to 5 minutes, then is immersed in a water bath at about room temperature, the polymer film coagulates into a microporous cellular structure which is permeable to water vapor. The water bath removes the polymer solvent by extraction and the construction is dried. These permeable films, either alone, as when stripped from the glass release substrate, or as a surface coat on permeable textile substrates, are useful as leather substitutes. The polymer surfaces can be colored, embossed, and finished to leatherlike patterns and grains. They have flex and abrasion resistance and a comfortable level of moisture vapor permeability.

Plied to a polymer impregnated, vapor permeable, nonwoven textile substrate, these permeable films and film/sheeting laminates form constructions which are particularly useful in the manufacture of shoe upper materials. The polymer impregnated substrate is typically a nonwoven textile batt, preferably one made from synthetic fibers such as polyester, polypropylene, rayon, polyamide and the like. Nonwovens are made by procedures well known in the art — carding, garneting, water-laying and the like. The nonwoven substrate is generally not useful as a foundation for a shoe upper material unless it is first impregnated with a polymeric matrix to provide body and strength. The impregnating polymeric matrix may be condensation polymer such as polyurethane, a vinyl terminated polymer such as polybutadiene, polyacrylonitrile, nitrile rubber (butadiene-acrylonitrile copolymer) or polyalkyl acrylate. The important feature of a polymer impregnated nonwoven substrate employed for a shoe upper material is that the polymeric matrix be only slightly adhered to the fibers of the textile batt. The degree of adhesion of matrix to fibers is sufficiently low if the impregnated textile has a suppleness factor of 100 psi or lower when measured by ASTM procedure D1388- 55T. These materials for shoe upper construction must also have moisture vapor permeability (MVT) which is herein measured according to Federal Specifications on Leather; Methods of Sampling and Testing, Specification Number KK–L–311a Method 8011. The MVT is given as grams of water vapor transmitted per square meter per 24 hours. An MVT value below 200 g/sq.m/24 hrs. is not considered to be acceptable. Satisfactory impregnated nonwoven substrates are readily prepared according to the teaching of U.S. Pat. No. 3,384,502.

Materials particularly useful for manufacture of shoe uppers as prepared by making a nonwoven web of, for example, mixed polypropylene and rayon, 60/40 by weight, by carding and crosslaying. This web material, impregnated with a carboxylic polyethyl acrylate latex by the procedure of U.S. Pat. No. 3,384,502, has a suppleness value of 36.9 psi and an MVT of 459 g/sq. m/24 hrs.

In a separate processing operation, a woven textile sheeting is coated at 65° C. with a 55° C. cloud point thixotropically thickened cement of essentially linear polyurethane in dimethylformamide by the method taught in U.S. Pat. No. 3,460,969 producing a microporous, permeable laminate with an MVT of 995 g/sq. m/24 hours.

It would be desirable to prepare a laminated construction of (1) the nonwoven polymer impregnated substrate and (2) the textile sheeting coated with vapor permeable essentially linear polyurethane top film by spreading an adhesive cement layer between the two materials and adhering the layers. Attempts to do this meet with little success. If adhesion of the layers is achieved, the adhesive film tends to set in an impermeable configuration because the water extraction baths used to help create a permeable film structure do not properly remove the solvent from the adhesive layer, probably because the top film has already been set into a permanent configuration.

Therefore, it has been past practice to form an impregnated nonwoven substrate, dip the woven textile sheeting into the polyurethane cement to coat both sides thereof, adhere the dipped sheeting to the substrate by a pressure lamination, immediately apply a heavier coat of the linear polyurethane cement to the adhesive side of the sheeting at 45° C. or higher, hold the construction in air for 5 minutes, then move it through an extraction bath for solvent removal. When dried, this construction can be finished to a leatherlike appearance and is a useful material for manufacture of shoe uppers. The adhesive layer at the sheeting interface is formed into a vapor permeable configuration by the same baths which so form the polyurethane top film because the adhesive layer is processed by the baths at the same time the top film is processed.

To make the adhesive layer vapor permeable by the method just described it has been necessary to carry the entire laminate construction of top film, sheeting interlayer, adhesive layer and impregnated nonwoven substrate into a water bath to extract the solvent from the adhesive layer and to coagulate the polymer in said adhesive layer in a permeable, cell-like structure. This procedure has several drawbacks. It is necessary to perform the lamination before the top film is given its leatherlike emboss and finish which means that the entire construction then must be processed through these finishing steps even though these steps affect only the top film layer. If the top film layer should be marred, scratched or otherwise spoiled in these finishing steps, it is then necessary to downgrade or scrap the entire construction — at considerable economic loss.

There would be many advantages if one could make a permeable laminate construction of a polymer impregnated nonwoven substrate, optional interlayer textile web and top polyurethane film, said film to be treated by coloring, embossing and finishing, either by forming said film only on the said interlayer, or in a removable condition on an easily separable substrate if no interlayer is used, while simultaneously, but separately, forming and impregnating the nonwoven substrate layer. After the film or film/interlayer portion is completely colored, embossed and finished to specification, it can be adhesively laminated to the impregnated substrate layer. Only surface film that meets process specifications need be adhered to said substrate and economic losses due to imperfect surface film will be minimized as no substrate will be scrapped with film that is spoiled in finishing operations.

The problem solved by this invention is to provide a polymer cement which can be applied to the surface of a vapor permeable textile substrate which will upon proper processing, serve either as a vapor permeable surface finish for said substrate or as a vapor permeable adhesive layer to bond said substrate to a second vapor permeable textile stratum. In the practice of the invention, the particular cement provided for this purpose can be applied to a textile substrate stratum, or can be spread upon an impermeable release substrate. In the latter case a textile stratum is then adhered to the adhesive layer, and after bonding, the laminate is stripped from the release layer.

It is also known in the art to form a vapor permeable laminate without an interlayer textile web between the top film and the substrate. A substantially colloidal polymeric dispersion, generally of a polyurethane and water in dimethyl formamide is spread on a polymer impregnated fibrous substrate. The coated substrate is immersed in a bath of an inert nonsolvent which is miscible with the solvent and the polymer forms into a microporous layer adherent to the substrate. Here too, errors in coloring, embossing and finishing the top film lead to high scrap rates and waste of already adhered and costly substrate.

SUMMARY OF THE INVENTION

This invention provides a process for making a vapor permeable composite construction of polymer impregnated nonwoven textile substrate, optional interlayer textile sheeting, and essentially linear polyurethane top film which has an acceptable MVT when completely finished and ready for cutting into patterns for shoe uppers. The process offers the quality and economy advantages of preparing and processing the nonwoven substrate separately from the upper composite of top film and sheeting or top film alone, if interlayer sheeting is not used. The top film is coated on the interlayer sheeting by methods known in the art and is then colored, embossed and finished before being laminated to the nonwoven substrate. If no sheeting is to be used, the film is formed on a temporary substrate such as glass or release paper, processed, and then separated from the temporary substrate. When lamination of permeable film to permeable nonwoven substrate is performed, this step is accomplished by what is described as a dry process, that is, the total structure need not be immersed in a bath of nonsolvent to render the adhesive portion microporous and permeable as is done in the prior art. The key to the process of the invention lies in a particular adhesive cement system which employs an essentially linear polyurethane polymer dissolved in the particular solvent, tetrahydrofuran, in the presence of a significant proportion of nonsolvent liquid and other additives which assure an acceptable level of moisture vapor permeability. This cement dries to a microporous, moisture vapor permeable configuration and, surprisingly, does not have to be subjected to an inert solvent bath to accomplish this. A further feature of the invention is that the new adhesive composition can be used not only to adhere two surfaces to each other, but when it is placed in contact with a surface and allowed to dry exposed to the atmosphere, it also forms an adherent, nontacky, flexible, porous and vapor permeable protective finish for the surface. It is further useful as a transfer coating in preparing two layer permeable constructions by the process of spreading the fluid cement of the invention on a release substrate, drying this surface to a tacky state, laminating a vapor permeable textile stratum to said tacky surface, and, when the construction is completely dry, peeling the laminate of textile and adhesive from the release substrate.

A composition comprising:

| Material | Parts |
| --- | --- |
| Polyurethane | 100 |
| Tetrahydrofuran | 200–600 |
| Pyrogenic silica | 12.5 |
| Alkyl trimethyl ammonium chloride* | 2.5 |
| Glycerol | 2.0 |
| Water | 20–80 |

*Arquad 18-50 (Armour Chemical Company), alkyl is 6% hexadecyl $C_{16}$, 93% octadecyl $C_{18}$, and 1% octadecenyl $C_{18}$.

is provided as a dry process adhesive and as a finish coat for use in the following process:

A moisture vapor permeable laminate construction, useful for forming shoe uppers and other flexible leatherlike articles is fashioned by first impregnating a nonwoven textile substrate material as taught in the prior art. Separately from the substrate fabrication and processing, a thixotropic cement of an essentially linear polyurethane is spread on a woven sheeting (the interlayer of the final composite) and is coagulated into a microporous configuration after an air set period followed by immersion in a bath of a liquid which is inert to the polyurethane as shown in the prior art. The polyurethane film is colored, embossed and finished according to practices known in the art of styling thermoplastic films and leathers.

As a permeable, porous top finish for surface protection of the processed polyurethane film, a cement composition, as set forth above, is applied to the film and dried.

The impregnated nonwoven substrate is coated by any convenient method such as spraying, roller coating, dipping, brushing, padding or printing with a layer of adhesive as set forth above. The top film or film/interlayer composite is laminated in a dry process by pressure rolls or other convenient means to the adhesive coated side of the nonwoven substrate and the total structure is dried at 100° C. The structure is permeable to water vapor and the layers adhere together strongly enough to protect against delamination under flexing.

The finished structure has the leatherlike properties of prior art vapor permeable materials, and, in particular, has outstanding MVT values compared to materials produced in the prior art. By-products of the use of the dry process adhesive and finish composition provided by the invention are the economies offered by not having to carry nonwoven substrate through the entire process and of having to stockpile nonwoven substrate only to match satisfactory top film or film/interlayer composite actually produced.

The preferred top film polymers are substantially linear thermoplastic polyurethanes prepared by mixing 1 mol polyester having molecular weight 600 to 2,000 with about 1.1 to 3.1 mols of a diphenyl diisocyanate in the presence of 0.1 to 2.1 mols of a glycol containing 2 to 10 carbon atoms in a ratio such that the number of mols of diisocyanate equals the sum of the mols of polyester and glycol, as described in U.S. Pat. No. 2,871,218. They have essentially no free hydroxyl or isocyanate groups.

Substantially linear thermoplastic polyether urethanes are reaction products of 1.5 to 10 mols of a diphenyl diisocyanate, one mol of polyalkylene ether glycol and 0.5 to 9.0 mols of a 4 to 12 carbon atom aliphatic glycol, the number of mols of diisocyanate being equal to the sum of the mols of the glycols, as described in U.S. Pat. No. 2,899,411. They have essentially no free hydroxyl or isocyanate groups.

When these substantially linear polyurethanes having essentially no free hydroxyl or isocyanate groups are spread as wet films for conversion to the microporous, permeable state, they are spread upon substrates at temperatures above room temperature in the form of thixotropically thickened cements that have cloud points above room temperature. The minimum coating temperature consistent with good cell structure in the microporous film is about 45° C. and a given cement is spread at a temperature about 50° C. above its cloud point. Cloud point is defined as the temperature at which a mixture of a major portion of substantially linear polyurethane and a minor portion of water will form a hazy dispersion in a solvent for the polyurethanes such as N,N'-dimethyl formamide, N,N'-dimethyl acetamide, tetrahydrofuran and dimethyl sulfoxide. The amount of water employed in these cements is generally 5 to 70 percent by weight of the linear polyurethane polymer present, and amounts to 1 to 15 percent by weight of the total cement. From 2 to 15 percent of a thixotropic thickening agent, based on the weight of polyurethane polymer, is added to the polymer cement. Stated as a function of the weight of the total cement, the proportion of thickening agent amounts to 0.2 to 2.5 percent.

Particular thickening agents which have the power to thixotropically increase the viscosity of a cement of linear polyurethane polymer in a dimethylformamide-water mixture are carboxy vinyl polymers, sodium carboxy methyl cellulose, polyacrylate salts, and, most preferred, pyrogenic silicas. A typical pyrogenic silica has a particle size of 0.015 micron, surface area of 200 $m^2/g$ and a bulk density of 2.2 lb/c.f. The thickening effect of a given amount of viscosity improver may be further improved by the addition of a small amount of a polar liquid and cationic or non-ionic additives. Typical polar liquids that can be employed with the thixotropic viscosity improvers include lower alkyl alcohols such as methanol, ethanol, propanol, and butanol, lower alkyl acetates such as ethyl acetate, and butyl acetate, lower alkylene glycols such as ethylene glycol, glycerol, lower alkyl ketones such as acetone, and methyl ethyl ketone, and acetic acid. Cationic additives include octadecyl trimethyl ammonium chloride, soy trimethyl ammonium chloride, and 1-(2-hydroxy ethyl)-2-heptadecenyl-2-imidazoline and non-ionic additives include isooctylphenyl polyethoxy ethanol, alkyl polyoxy-alkylene ethers and polyoxyethylene sorbitol oleate. A mixture of 73.5 percent fine, pyrogenic silica (12.5 parts), 11.8 percent glycerol (2.0 parts) and 14.7 percent of octadecyl-trimethyl ammonium chloride (2.5 parts) added to 100 parts of a linear polyesterurethane dissolved in 565–186 parts dimethylformamide and sufficient water to form the cloud point solution provides excellent thixotropic increase in viscosity of the polymer solution to allow wet spreading of 40 – 60 mil films on substrates. The pyrogenic silica is not actually soluble in dimethylformamide, but it is so fine in particle size and is so completely dispersed that the cement system looks and performs as a true solution.

Despite the stated equivalence of the solvents dimethylsulfoxide, N,N'-dimethylformamide, N,N'-dimethylacetamide and tetrahydrofuran, attempts to use the cements of the prior art as adhesives for substrate to top film or top film/interlayer sheeting composites in a dry process with no nonsolvent bath to extract solvent and aid in forming microporous structure in the adhesive layer, are uniformly failures in providing permeable structures unless, and only unless, tetrahydrofuran is employed as the specific solvent in the adhesive layer. The action of this particular solvent to evaporate under heat alone rather than to exert a solvent action on the just created microporous structure so as to collapse that structure back into an impermeable film is a surprising discovery.

DETAILED DESCRIPTION OF THE INVENTION

EXAMPLE I

A linear polyesterurethane polymer is prepared by following the teaching of U.S. Pat. No. 2,871,218. First 1,000 g. (1.0 mol) of hydroxyl poly(tetramethylene adipate), molecular weight 1,000, hydroxyl number 112, acid number 2.5, and 180 g. (2.0 mols) of butanediol-1,4 are mixed in a heated autoclave with stirring for 15 minutes at 10 mm pressure at 100° to 105° C. Next 750 g. (3.0 mols) of diphenylmethane-p,p'-diisocyanate are added and stirred for 2 minutes. The melt is poured into lubricated metal trays and held in an oven at 140° C. for 3 hours.

A solution of this polymer is prepared by dissolving 100 parts of the polyesterurethane in 340 parts dimethylformamide (DMF). Twelve and one-half parts of a pyrogenic silica having a particle size of 0.015 micron, surface area of 200 m² per g. and bulk density of 2.2 lbs. per cu.ft. are dispersed in 50.0 parts water, and 60 parts DMF and added to the polymer solution at 60° C. Two parts of glycerol is combined with 2.5 parts of octadecyl-tri-methyl ammonium chloride and stirred in at 60° C. to form a smooth polymer cement, labeled "A," which is suitable for spreading on a textile substrate or on an impermeable substrate such as glass to form a microporous polymer film as disclosed in the prior art in U.S. Pat. No. 3,460,969. Cement A has a cloud point of 50° C.

The polyesterurethane is also prepared as a cement in the following recipes:

| Ingredient | Parts by Weight | |
|---|---|---|
| | B | C |
| Polyesterurethane | 100 | 100 |
| Dimethylformamide | 457 | — |
| Tetrahydrofuran | — | 457 |
| Pyrogenic silica | 12.5 | 12.5 |
| Glycerol | 2.0 | 2.0 |
| Octadecyl-trimethyl ammonium | 2.5 | 2.5 |
| Water* | 43 | 62 |
| Brookfield viscosity at 25° (cps) No. 5 spindle** | | |
| 2.5 rpm | 3200 | 14,000 |
| 5 rpm | 2560 | 8,000 |
| 10 rpm | 2240 | 5,600 |

* The amounts of water are such that the cement has a cloud point of 18°–20° C.

** Decrease in viscosity as spindle speed increases is indicative of a thixotropic increase in viscosity.

The octadecyl-trimethyl ammonium chloride and glycerol are mixed with the selected solvent at room temperature. Next the pyrogenic silica is mixed in and dispersed. Polyesterurethane is added in pellet form and dissolves with stirring in 1 – 1½ hours at room temperature.

Water is added slowly with stirring as the temperature is maintained at about 25° C, just above the cloud point and below the boiling point of THF (66° C).

A polyester-cotton woven sheeting, 65 percent polyester/35 percent cotton, 96 × 96 count, 2.7 oz/yd.², is dipped in water and passed through ringer rolls to remove free water and leave 40 to 60 percent pickup of water in the sheeting by weight of sheeting. Cement B is applied to a first length and cement C is applied to a second length of the wet sheeting by spreading with a draw bar at room temperature. The wet thickness of cement applied to the sheeting is 8 – 10 mils. The cement coated sheeting is held in air for 10 – 20 seconds as the coating tackifies (solvent evaporation starts immediately as the cement is spread). These pieces are identified as B and C, corresponding to the particular cement applied.

A suitable microporous substrate is prepared from a nonwoven batt, consisting of 60 percent polypropylene, 40 percent rayon, formed by carding and cross-laying technique from 1.5 denier, 1.5 inch long fibers, with a weight of 9.5 oz. per sq.yd., a thickness of 0.040 inch, a density of 0.29 g./cc., needled to a level of 2,300 punches per sq. in., which is dipped in a 10 percent aqueous solution of sodium bicarbonate, then immersed in 35 percent solids, carboxyl-modified butadiene-acrylonitrile (70/30) copolymer latex containing 5 percent sodium bicarbonate on latex total solids. Next the batt is dipped in 5 percent calcium chloride to coagulate the latex, and in 5 percent acetic acid to remove the sodium bicarbonate. The treated batt is washed in warm water and dried. It has a polymer pickup of 119 percent on weight of fabric, thickness of 0.045 inch, MVT of 690 g/sq. m/24 hrs., and a degree of suppleness as measured by ASTM procedure D 1388–55T of 71.5 psi. This batt is divided into six sections 6 × 18 inch, marked 1 through 6, and processed as follows.

The tacky, cement coated sheetings B and C are laminated through the adhesive layers to the impregnated nonwoven substrate backer pieces 1 and 2, respectively, by passing the materials between pressure squeeze rolls set for light squeeze, 0.50 to 1.50 lbs/inch width, and dried in an air oven at 100° C. They are identified as B1 and C2.

A separate length of the polyester-cotton woven sheeting is dipped in water and squeezed through wringer rolls to give 50 percent pickup of water by weight of the sheeting. The prior art coating cement A is spread on this wet sheeting to a thickness of 40 mils by a draw bar spreading technique at 65° C. The cement coated substrate stands in air for 5 minutes at room temperature, then is immersed in a water bath at 20° C. for 90 minutes. The construction is dried at 100° C. for 1 hour and has an MVT of 830 g/sq.m/24 hrs. It is identified by its cement coating as A.

The microporous polyurethane coated sheeting, A is dipped in water and passed through squeeze rolls to leave it holding 40 – 60 percent by weight of water based on weight of coated sheeting. Sections of this wet material are draw bar boated with 8 – 10 mils of wet cements B and C on the sheeting side of the laminate and identified as AB and AC, respectively. An air set time of 10 – 20 seconds is allowed to permit the cements to tackify. The adhesive coated sheetings AB and AC are laminated to sections 3 and 4 respectively of the impregnated nonwoven substrate through the adhesive layer by squeezing the layers between pressure rolls at 1.0 lbs./in. and drying the new laminates at 100° C. in an air oven. These are now identified as AB3 and AC4, respectively.

A separate batch of cement A is spread at 65° C. on a substrate of silicone treated release paper maintained at 65° C., held in air 5 minutes at 20° C., then immersed in a 20° C. water bath for 90 minutes to extract solvent. The extracted sheet and substrate are dried in an oven for 1 hour at 100° C. to remove the water and the residue, if any, of the solvent. The dried polyurethane film is stripped from the release paper substrate. It has a thickness of 15 mils and an MVT of 870 g/sq.m/24 hrs. and is identified as AA.

The microporous polyurethane film AA is dipped in water, passed through squeeze rolls to remove free water (water pickup is 50 percent by weight of the film), and is draw bar coated with 10 mils of wet cements B and C. These structures, identified as AAB and AAC, stand 15 seconds in air to tackify the adhesive surface and then are laminated to nonwoven substrate sections 5 and 6 respectively by passing through squeeze rolls set at 10 lbs/in. width. The structures are dried in an air oven at 100° C. and are now identified as AAB5 and AAC6 respectively.

The various constructions are evaluated for MVT and adhesion between layers. Minimum acceptable MVT for comfort in a shoe is 250 g/sq.m/24 hrs. and minimum acceptable adhesion for goods that will be used in shoe uppers is 2.0 lbs./inch.

| Designation | Construction Description | MVT g/sq.m/ 24 hrs | Acceptable yes or no | Adhesion lbs/in. | Acceptable yes or no |
|---|---|---|---|---|---|
| C2 | uncoated woven sheeting on nonwoven-adhesive C | 927 | yes | 3.7 | yes |
| B1 | uncoated woven sheeting on nonwoven-adhesive B | 214 | no | 3.3 | yes |
| AC4 | polymer coated sheeting on nonwoven-adhesive C | 680 | yes | 4 | yes |
| AB3 | polymer coated sheeting on nonwoven-adhesive B | 165 | yes | 1.0 | no |
| AAC5 | polymer film applied directly to nonwoven-adhesive C | 541 | yes | 6 | yes |
| AAB5 | polymer film applied directly to nonwoven-adhesive B | 109 | no | 3.0 | yes |

Adhesive C — based on the solvent tetrahydrofuran—leads to laminated constructions which have a degree of MVT high enough for comfort in a shoe upper construction, but adhesive B, based on the solvent dimethylformamide, produces laminates with MVT values too low to consider for shoe upper use. Except for the solvent, the adhesives and laminate structures and the method of preparation and testing are the same throughout. This result is unexpected because the prior art has considered THF and DMF to be equivalent solvents for use in preparing polyurethane cements for preparing microporous films suitable for use alone or in laminate constructions in shoe uppers, upholstery and other leatherlike uses. When the experiment is repeated using as solvents dimethylsulfoxide and N,N'-dimethylacetamide, the results are comparable to the use of dimethyl formamide.

EXAMPLE II

Cements B and C of Example I are further evaluated as finish coats on various substrates as follows:

A thickness of 15 mils of wet cement is spread on silicone treated release paper. The films are dried in an air oven at 100° C. and subside to a thickness of 2 mils in the dry state.

The dry, 2 mil films are stripped from the release paper and identified as B and C.

The construction of polyurethane cement A of Example I, spread on impregnated nonwoven substrate of Example I is top coated with 10 mils wet thickness of cements B and C on the polymer side and dried in the air oven at 100° C. These constructions are identified as BAA and CAA.

MVT

| Designation | Construction Description | g/sq.m/ 24 hrs. | Acceptable yes or no |
|---|---|---|---|
| C | Cement dried and stripped from release paper | 546 | yes |
| B | Cement dried and stripped from release paper | 179 | no |
| CAA | Cement dried on polymer A coated nonwoven substrate | 460 | yes |
| BAA | Cement dried on polymer A coated nonwoven substrate | 111 | no |
| Control | Nonwoven substrate coated with polymer A and no cement finish | 843 | yes |

The cement of the invention (C) forms a permeable finish film. The corresponding film based on dimethylformamide is impermeable. When the cements are spread and dried as a durable top finish on permeable substrates, the cement of the invention gives a permeable top finish and construction. The dimethylformamide based cement forms an impermeable finish coat.

EXAMPLE III

Cements B and C of Example I are evaluated as a transfer coating in the following manner. A thickness of 15 mils of wet cement is coated on silicone treated release paper and dried in air for 1 minute at room temperature to yield a tacky cement surface. A napped sateen cloth, 7 oz/yd.$^2$, 60 × 61 yarns per inch, ⅗ 5 harness filling sateen, dyed, napped and sheared one side, is dipped in water and squeezed to remove free water. The cloth picks up 175 percent of its own weight of water. The wet cloth is laminated to the tacky cement by pressing the napped surface against the cement as the two plies pass through squeeze rolls set for light pressure by adjusting the gap between rolls to 2 mils greater than the combined thickness of the wet sateen and the cement coated paper. The construction is dried at 100° C. and the release paper is separated leaving a 2–3 mil permeable film laminated to the napped sateen. The material is soft, supple, has excellent hand and is useful in making upholstery and outer surfaces for clothing items such as jackets.

The construction based on cement C of the invention is tested with the following results.

| Test | Value |
|---|---|
| MVT | 492 g/m$^2$/24 hrs. |
| Film adhesion | 2.5 lbs/in. width |

Cement B, based on dimethylformamide, fails completely in this evaluation because of low MVT.

When nylon tricot, 4 oz/yd.$^2$, napped one side, 42 wales per inch is used in a similar construction in place of the napped sateen, a similar attractive and permeable construction is produced.

I claim:

1. A vapor permeable laminate structure comprising in combination
   1. as a bottom layer a nonwoven, vapor permeable polymeric impregnated textile substrate,
   2. a vapor permeable adhesive layer atop said bottom layer,
   3. a vapor permeable polyurethane surface film atop said adhesive layer and,
   4. a vapor permeable adherent surface finish layer atop said surface film wherein said adhesive layer (2) and said finish layer (4) are applied to said substrate (1) and to said surface film (3) respectively as fluid cements comprising in parts by weight

| | |
|---|---|
| Polyurethane | 100 |
| Tetrahydrofuran | 200–600 |
| Thixotropic viscosity improver | 15–20 |
| Water | 30–100 |

* * * * *

UNITED STATES PATENT OFFICE
CERTIFICATE OF CORRECTION

Patent No. 3,663,351  Dated May 16, 1972

Inventor(s) Walter T. Murphy

It is certified that error appears in the above-identified patent and that said Letters Patent are hereby corrected as shown below:

Column 4, line 45, "50°C." should read ---5°C.---.

Signed and sealed this 24th day of October 1972.

(SEAL)
Attest:

EDWARD M. FLETCHER, JR.
Attesting Officer

ROBERT GOTTSCHALK
Commissioner of Patents